United States Patent

Kitatsuji et al.

[11] Patent Number: 5,536,410
[45] Date of Patent: Jul. 16, 1996

[54] METHOD FOR PREVENTING ACTIVATED SLUDGE FROM LOSING ITS SETTLING ABILITY

[75] Inventors: Katsura Kitatsuji; Tetsuro Fukase; Kingo Chu, all of Tokyo, Japan

[73] Assignee: Kurita Water Industries Ltd., Tokyo, Japan

[21] Appl. No.: 327,324

[22] Filed: Oct. 21, 1994

[30] Foreign Application Priority Data

Oct. 22, 1993 [JP] Japan ................................ 5-265228
Oct. 4, 1994 [JP] Japan ................................ 6-240393

[51] Int. Cl.$^6$ ............................. C02F 1/50; C02F 3/12
[52] U.S. Cl. .................... 210/626; 210/631; 210/728; 210/729; 210/734
[58] Field of Search ............................ 210/631, 727, 210/728, 729, 608, 626, 732, 733, 734, 735, 736

[56] References Cited

U.S. PATENT DOCUMENTS

| | | | |
|---|---|---|---|
| 3,259,570 | 7/1966 | Priesing et al. | 210/727 |
| 4,341,632 | 7/1982 | Gregor et al. | 210/631 |
| 4,675,114 | 6/1987 | Zagynai et al. | 210/727 |
| 4,710,298 | 12/1987 | Noda et al. | 210/728 |
| 4,732,684 | 3/1988 | Fujino | 210/631 |
| 4,956,092 | 9/1990 | Blum | 210/631 |
| 5,006,639 | 4/1991 | Tono et al. | 210/727 |
| 5,308,499 | 5/1994 | Dixon et al. | 210/727 |

FOREIGN PATENT DOCUMENTS

| | | |
|---|---|---|
| 49-3468 | 1/1974 | Japan . |
| 56-7683 | 1/1981 | Japan ................ 210/727 |
| 63-218298 | 9/1988 | Japan ................ 210/631 |
| 63-242398 | 10/1988 | Japan ................ 210/631 |
| 217998 | 1/1990 | Japan ................ 210/631 |

Primary Examiner—Peter A. Hruskoci
Assistant Examiner—Theodore M. Green
Attorney, Agent, or Firm—Flynn, Thiel, Boutell & Tanis

[57] ABSTRACT

A method for preventing activated sludge from losing its settling ability, which sometimes happens in solid/liquid separation in an activated sludge treatment of an aqueous organic waste and causes the so-called bulking and scumming of the sludge. This method involves adding either (a) a nonionic and/or an anionic surfactant, (b) a combination of a nonionic surfactant with a cationic surfactant of a form of quaternary ammonium salt or (c) a combination of a nonionic surfactant and a cationic surfactant of a form of a quaternary ammonium salt with a cationic organic flocculant, to the activated sludge treatment system.

9 Claims, 2 Drawing Sheets

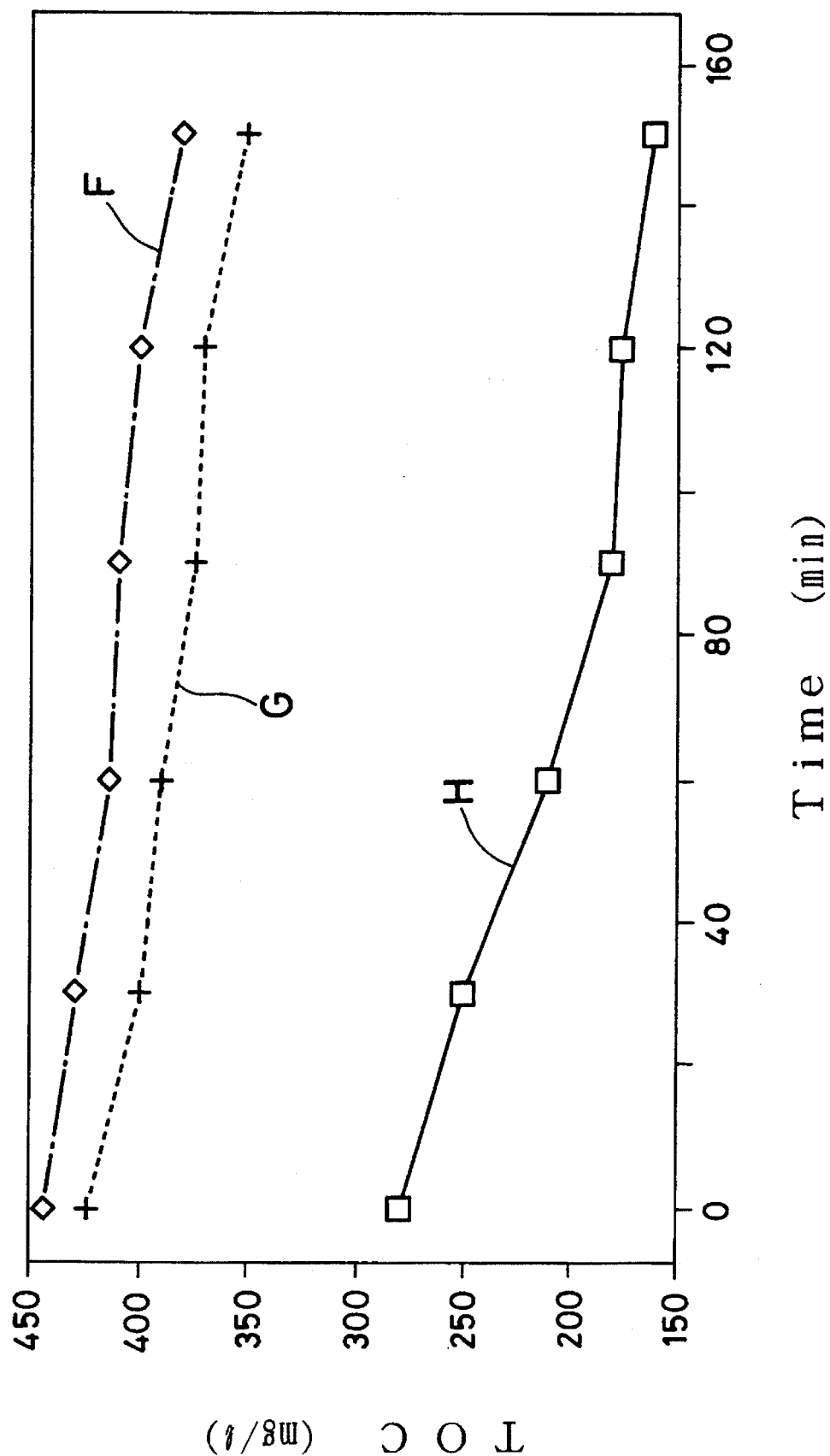

METHOD FOR PREVENTING ACTIVATED SLUDGE FROM LOSING ITS SETTLING ABILITY

FIELD OF THE INVENTION

The present invention relates to a method for preventing activated sludge from losing its settling ability, which happens sometimes in the solid/liquid separation in an activated sludge treatment of an aqueous organic waste and causes the so-called bulking and scumming of the sludge.

BACKGROUND OF THE INVENTION

An activated sludge treatment of an aqueous organic waste is performed usually by admixing an activated sludge with the waste to be treated, aerating the mixed liquor in an aeration tank to subject the organic matter in the waste to biodegradation by microorganisms in the activated sludge and separating the sludge from the aerated mixed liquor in a settling tank, whereupon the supernatant is discharged out of the treatment system as a treated water, while the separated sludge is partly returned to the aeration tank as a return sludge and the remainder is exhausted out of the system as excess sludge. In such an activated sludge treatment of an organic matter-containing aqueous waste, the organic matter is subjected to biodegradation by the activated sludge in which certain bacteria such as Zoogloea etc., have come to prevail over others. However, in some cases, the nature of the raw waste and the conditions of the sludge treatment may rather facilitate multiplication of filamentous microorganisms, for example, filamentous bacteria, such as Sphaerotilus etc., and actinomycetes of the genus Nocardia, whereby the bulking or scumming of the sludge is caused. A classification of filamentous microorganisms found in an activated sludge is proposed by D. H. Eikelboom ("Water Research" Vol. 9, pp 365–388, Pergamon Press 1975). In the "bulked" sludge, there is often observed a filamentous bacterium which is named "Type 021N" by D. H. Eikelboom.

Bulking is a phenomenon in which the sludge becomes light and is broken up due to the multiplication of filamentous microorganisms, whereby the sludge loses its settling ability. When bulking occurs, the separation of the sludge in the settling tank becomes difficult and a part of the sludge will be discharged out of the system with the treated water, so that a sufficient amount of the return sludge is not reserved and the biotreatment performance is decreased.

When actinomycetes of the genus Nocardia multiplicates, there may occur, in addition to the possible occurrence of the bulking phenomenon, scumming in which a part of the sludge floats up to form a scum accompanied by foams which are formed by mycolic acid, an ultrahigher fatty acid, whereby the settling ability of the sludge is lost.

Hitherto, a method has been used for preventing the multiplication of the filamentous microorganisms with various biocides, in order to prevent occurrence of the bulking caused by filamentous microorganisms, wherein a quaternary ammonium salt was employed as the biocide. In Japanese Patent Application Kokai No. 112902/1984, it is disclosed that benzalkonium chloride, benzethonium chloride and mixtures of them can sterilize only the filamentous microorganisms without having influence on the other bacteria and can prevent occurrence of the bulking.

However, a quaternary ammonium salt acts in general as a bacteriocide and suppresses multiplication of bacteria other than filamentous bacteria and has an undesirable influence also on humans and animals, so that it is generally undesirable to use it. (See, for example, Japanese Patent Application Kokai No. 35895/1986).

Use of chlorhexidine hydrochloride and the like will also encounter a difficulty in controlling an effective but safe dose, since they are a powerful bactericide and, when using in an excessive amount, sterilization of other useful bacteria may be brought about. When using in an insufficient amount, the bactericidal action to the filamentous bacteria becomes insufficient. Therefore, the permissible dose range of practical use of such a bactericide is quite limited and, in addition, the effective dose of such a bactericide is different for each specific condition of the operation of the aeration tank and for each specific filamentous bacterium, so that setting of the operation condition for attaining a predetermined performance is very complex. Using a bactericide for preventing the phenomenon of bulking of the sludge, in general, the contemplated effect for attaining sterilization of the filamentous bacteria by the addition of such a bactericide appears only after a certain period of time from the addition of the bactericide, so that there is a problem in its immediate effect.

A method has been proposed for preventing the phenomenon of bulking of the sludge by adding a biostatic bactericide together with a cationic organic flocculant to the activated sludge treatment system (Japanese Patent Application Kokai No. 71286/1994).

Such a technique implies the same problems as above, so long as the biostatic bactericide constitutes the principal effective substance. A cationic organic flocculant itself has been employed for preventing the problem of the bulking (Japanese Patent Application Kokai No. 3468/1974). Here, the bulking is prevented by coagulation of the sludge by the addition of the flocculant and, hence, the contemplated preventive effect is brought about immediately after the addition of the flocculant. Here however, there is a problem in the durability of such a preventive effect and, when such a forced flocculation is successively incorporated, the preventive effect becomes faded. Combination of the biostatic bactericide with a cationic flocculant does not lead to any unexpected effect.

SUMMARY OF THE INVENTION

An object of the present invention is to provide a method for preventing activated sludge from losing its settling ability during an activated sludge treatment of an aqueous organic waste, without causing any harmful influence on the useful bacteria in the activated sludge and on humans and animals as well, to thereby attain an efficient prevention of the occurrence of the phenomenon of bulking and scumming of sludge in the settling tank caused by multiplication of filamentous bacteria and actinomycetes.

Another object of the present invention is to provide a method for preventing activated sludge from losing its settling ability during an activated sludge treatment of an aqueous organic waste, to thereby attain a more efficient prevention of the occurrence of the phenomenon of bulking and scumming of sludge in the settling tank with a smaller dose of the treating reagents.

A further object of the present invention is to provide a method for preventing activated sludge from losing its settling ability during an activated sludge treatment of an aqueous organic waste, to thereby attain an immediate and long lasting effect of prevention of the occurrence of the phenomenon of bulking and scumming of sludge in the settling tank.

According to the present invention, methods are provided for preventing the activated sludge from losing its settling ability, wherein the first method comprises adding nonionic surfactant and/or an anionic surfactant to the activated sludge treatment system, the second method comprises adding a nonionic surfactant and a cationic surfactant of the form of quaternary ammonium salt to the activated sludge treatment system and the third method comprises adding a nonionic surfactant, a cationic surfactant of a form of quaternary ammonium salt and a cationic organic flocculant to the activated sludge treatment system.

BRIEF DESCRIPTION OF THE DRAWINGS

FIG. 2 is a graph showing the temporal variation of TOC observed in Example 11.

DETAILED DESCRIPTION OF THE INVENTION

Figure 1:
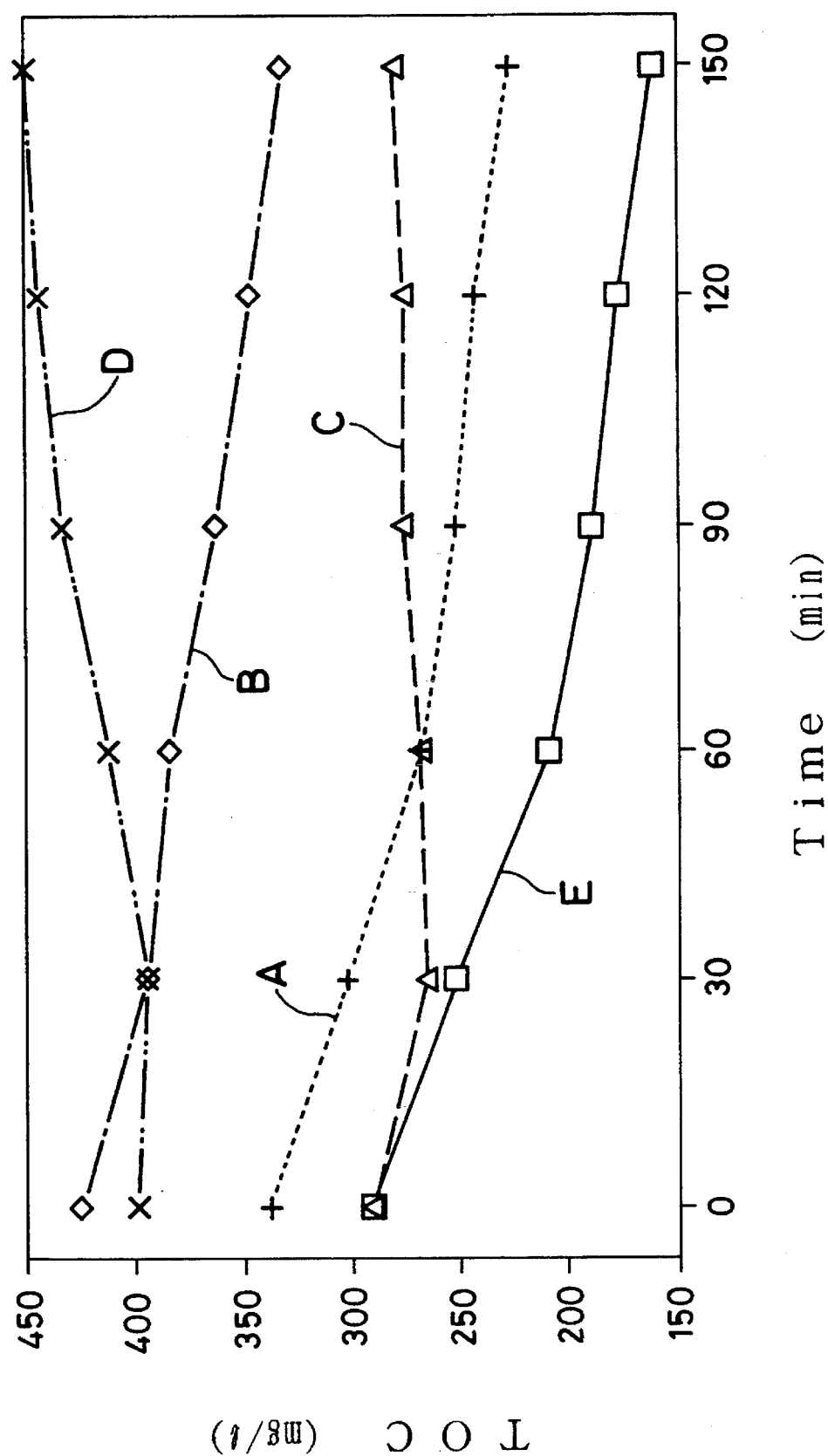
FIG. 1 is a graph showing the temporal variation of TOC observed in Example 4.

In the context of the present application, the activated sludge treatment system does mean every treatment system for realizing an aerobic biological treatment of an aqueous organic waste using an activated sludge, including, in addition to that of the conventional activated sludge treatment, those of various modifications thereof and combinations with other techniques. The treatment system as used herein refers to the total system for performing the above-mentioned treatment, wherein the problems of bulking and scumming of the settling tank can be prevented by adding the effective treating agents, such as the surfactants, at any voluntary location of the system. The "prevention" as used in the present invention comprehends not only the exclusion of occurrence of the phenomenon of bulking and scumming of sludge but also suppression of development or progression of an existing bulking or scumming of sludge.

There is no restriction as to the nonionic surfactant to be employed according to the present invention and those of natural and synthetic origins may be used. Nonionic surfactants have also been in domestic use and are safe, since they have no harmful action to bacteria other than filamentous bacteria and actinomycetes and to humans and animals as well. A nonionic surfactant is adsorbed on biosludge more facilitatedly than an anionic surfactant and exhibits less leakage into the treated water.

Preferable nonionic surfactants include those of the polyethylene glycol type, for example, ethylene oxide adducts of higher alcohols, ethylene oxide adducts of alkylphenols, ethylene oxide adducts of fatty acids, ethylene oxide adducts of fatty acid polyol esters, ethylene oxide adducts of higher alkylamines, ethylene oxide adducts of fatty acid amides, ethylene oxide adducts of oils and fats and ethylene oxide adducts of polypropylene glycols; and those of the polyhydric alcohol type, for example, fatty acid esters of glycerol, fatty acid esters of pentaerythritol, fatty acid esters of sorbitol, fatty acid esters of sorbitan, fatty acid esters of sucrose, alkyl ethers of polyhydric alcohols and fatty acid amides of alkanolamines. Among them, ethylene oxide adducts of alkylphenols and ethylene oxide adducts of higher alcohols are preferred. For the nonionic surfactant, those having an HLB value in the range of 8 –18, especially in the range of 10–15 are most preferable.

As the anionic surfactant to be employed in the first method of the present invention, carboxylic acid salts, such as soaps; sulfates, such as sulfates of higher alcohols, higher alkyl ether sulfates, sulfated oils, sulfated fatty acid esters and sulfated olefins; sulfonates, such as alkylbenzenesulfonates, alkylnaphthalenesulfonates and paraffinsulfonates; and phophates, such as phosphates of higher alcohols, may be exemplified.

In the first method of the present invention, the nonionic surfactant and/or the anionic surfactant is added either solely or in combination of two or more of them to the activated sludge treatment system to prevent the activated sludge from losing its settling ability to avoid the bulking and scumming of sludge in the settling tank. While the dose amount of the surfactants may be different depending on the specific surfactant employed, location of the dosage in the treatment system, practical way of dosage and so on, generally an amount of 5–1,000 mg, preferably 10– 200 mg of the surfactant or the surfactants per liter of the sludge-containing liquor may suffice. While the dosage of the surfactant(s) may be effected in a continuous manner, it is preferable to effect the dosage in an intermittent manner, in which the surfactant or the surfactants are added to the treatment system in discontinuous intervals, for example, once a day, in an amount to be calculated to a value in the above range for this period. In the case where the bulking has taken place in a slight degree, addition of only once may be enough for effective prevention.

The cationic surfactant to be employed in the second and third methods of the present invention is in a form of a quaternary ammonium salt. Such a cationic surfactant has found its practical application in general as a bactericide. By using it together with a nonionic surfactant, the problematic phenomena of bulking and scumming of sludge in the settling tank can be prevented, even at such a low dose at which a sole use of the cationic surfactant will have substantially no bacteriostatic nor bactericidal effect.

As the quaternary ammonium salt cationic surfactant, there may be employed preferably alkyl trimethylammonium salts, such as lauryl trimethylammonium chloride, myristyl trimethylammonium chloride, cetyl trimethylammonium chloride and stearyl trimethylammonium chloride; and alkylpyridinium salts, such as cetylpyridinium chloride and cetylpyridinium bromide. These compounds have a somewhat lower bactericidal activity as compared with chlorohexidine hydrochloride and benzalkonium chloride and, thus, considerable lower influence on the bacteria other than the filamentous bacteria and actinomycetes is realize, whereby a tolerable dose range is widened.

In the second method of the present invention, the quaternary ammonium salt cationic surfactant is added in combination with a nonionic surfactant to the activated sludge treatment system, in order to prevent the activated sludge from losing its settling ability and avoid the bulking and scumming of sludge in the settling tank. While the dose amount of the nonionic and cationic surfactants may be different depending on the specific surfactant employed, location of the dosage in the treatment system, practical manner of dosage and so on, generally an amount of 5–1,000 mg, preferably 10–500 mg of the nonionic surfactant and 0.5–100 mg, preferably 1–50 mg of the cationic surfactant, per liter of the sludge-containing liquor, respectively, may be pertinent.

As the cationic organic flocculant to be used in the third method of the present invention, there may be employed water-soluble organic high molecular weight cationic substances of natural and synthetic origins including cationic high polymeric flocculants. As the cationic high polymeric flocculants, there may be enumerated, for example, polymers based on aminated (meth)acrylate, polymers based on aminated (meth)acrylamides, Hofmann-degradation products of poly(meth)acrylamides, polyethyleneimines and polyalkylenepolyamines, though no limitation is placed.

As the polymers based on aminated (meth)acrylate, homopolymers of the cationic monomers based on aminated (meth)acrylate given below and copolymers thereof with the monomers based on nonionic vinyl compounds explained afterwards may be enumerated.

As the cationic monomers based on aminated (meth)acrylate, there may be enumerated, for example, neutralized salts of aminated (meth)acrylates, neutralized with acids, such as hydrohalogenic acids, sulfuric acid, nitric acid, acetic acid and the like, i.e. those of dimethylamino(methyl, ethyl, propyl or butyl)acrylates and -methacrylates, diethylamino(methyl, ethyl, propyl or butyl)acrylates and -methacrylates, di-n-propylamino(methyl, ethyl, propyl or butyl)acrylates and -methacrylates, diisopropylamino(methyl, ethyl, propyl or butyl)acrylates and -methacrylates, di-n-butylamino(methyl, ethyl, propyl or butyl)acrylates and -methacrylates, di-sec-butylamino(methyl, ethyl, propyl, or butyl)acrylates and -methacrylates and diisobutylamino(methyl, ethyl, propyl or butyl)acrylates and -methacrylates; quaternized products of the above-mentioned aminated (meth)acrylate with a quaternizing agent such as an alkyl halide, dimethyl sulfate or diethyl sulfate; and so on, though, of course, not restricted to them. As the hydrohalogenic acids, hydrochloric acid and hydrobromic acid are exemplified and, as the alkyl halides, methyl chloride, methylbromide, methyl iodide, ethyl chloride, ethyl bromide, ethyl iodide, benzyl chloride etc. are exemplified.

As the polymers based on aminated (meth)acrylamide, homopolymers of the monomers given below and copolymers of the nonionic vinyl monomers as described later on may be exemplified.

The cationic monomers based on aminated (meth)acrylamides include neutralized salts of aminated (meth)acrylamides, for example, dimethylamino(methyl, ethyl, propyl or butyl)acrylamides and -methacryl amides, diethylamino(methyl, ethyl, propyl or butyl) acrylamides and -methacrylamides, di-n-propylamino(methyl, ethyl, propyl or butyl)acrylamides and -methacrylamides, diisopropylamino(methyl, ethyl, propyl or butyl)acrylamides and -methacrylamides, di-n-butylamino(methyl, ethyl, propyl or butyl)acrylamides and -methacrylamides, di-sec-butylamino(methl, ethyl, propyl, or butyl)acrylamides and -methacrylamides and diisobutylamino(methyl, ethyl, propyl or butyl)acrylamides and -methacrylamides, neutralized with an acid, such as a hydrohalogenic acid, sulfuric acid, nitric acid, acetic acid or the like; and quaternized products of the above-mentioned aminated (meth)acrylamides with a quaternizing agent such as an alkyl halide, dimethyl sulfate or diethyl sulfate, though, of course, not restricted to them. As the hydrohalogenic acids, hydrochloric acid and hydrobromic acid are exemplified and, as the alkyl halides, methyl chloride, methyl bromide, methyl iodide, ethyl chloride, ethyl bromide, ethyl iodide, benzyl chloride etc. are exemplified.

As the nonionic vinyl monomer to be copolymerized with the cationic monomer given above, there may be employed, for example, vinyl group-containing amides, such as acrylamide, methacrylamide, N,N-dimethylacrylamide and N,N-dimethylmethacrylamide; compounds based on vinyl cyanide, such as acrylonitrile, methacrylonitrile and the like; alkyl esters of (meth)acrylic acid, such as methyl acrylate, ethyl acrylate, methyl methacrylate, ethyl methacrylate and the like; vinyl esters of carboxylic acids, such as vinyl acetate; aromatic vinyl compounds, such as styrene, α-methyl styrene and p-methyl styrene; and so on, though, of course, not restricted to them.

It is preferable to employ the cationic organic flocculant which has a colloid equivalent at pH 4 of 1.5 meq./g or higher, preferably 2.5 meq./g or higher and a molecular weight of 100,000–10,000,000, preferably of 1,000,000–10,000,000.

In the third method of the present invention, a combination of a nonionic surfactant and a cationic surfactant of a form of quaternary ammonium salt with a cationic organic flocculant is added to the activated sludge treatment system to prevent the activated sludge from losing its settling ability. Here, the amount of each component may preferably be in the range of 5–1,000 mg, preferably 10–500 mg of the nonionic surfactant, 0.5–100 mg, preferably 1–50 mg of the cationic surfactant of the form of quaternary ammonium salt and 2–50 mg, preferably 10–100 mg of the cationic organic flocculant, per liter of the activated sludge-containing liquor, while the pertinent amount may differ depending on each specific compound chosen, location of dosage in the treatment system, practical manner of the dosage and so on.

In the first to third methods of the present invention, the sludge-containing liquor to which the treating agents are to be added does mean every liquor containing the sludge irrespective of the concentration of the sludge. An example of a sludge-containing liquor having a lower sludge concentration is the mixed liquor in the aeration tank. An example of a sludge-containing liquor having a higher sludge concentration is the separated sludge (return sludge) from the sedimentation tank. When the dosage is effected to the mixed liquor in the aeration tank, the dose amount is settled so as to reach a concentration of the treating agent in the mixed liquor within the range mentioned above. When the dosage is effected to the return sludge, the dose amount is settled so as to reach a concentration of the treating agent the return in sludge within the range mentioned above.

In the first to third methods of the present invention, each of the treating agents (the surfactants and the flocculant) according to the present invention may consist of either a single product or a mixture of two or more products and can be dosed simultaneously or separately at any voluntary location in the activated sludge treatment system, while, in general, the dosage is effected preferably to the aeration tank. When the dosage is effected to the aeration tank, the dose amount is calculated on the basis of the total amount of the sludge-containing liquor in the aeration tank.

In case the condition of the aeration tank is such that the multiplication of filamentous bacteria or actinomycetes has been considerable, a dosage to the aeration tank may cause bacteriolysis of a considerable amount of the filamentous bacteria or actinomycetes and may bring about a temporal increase in the COD and SS in the treated water due to the fragments of bacterial cells to thereby lead to an undesirable influence on the treatment performance. In such a case, a gradual bacteriostasis of the filamentous bacteria or actnomycetes can be attained by effecting the dosage at the sludge return line while avoiding a total sterilization, whereby an effective prevention of the bulking and scumming can be attained without causing deterioration of the treated water quality as per COD and SS. When the dosage is effected to the sludge return line, the dose amount is calculated on the basis of the amount of the return sludge.

While the dosage of the treating agents according to the present invention may be realized continuously, it is preferable to effect the dosage in an intermittent manner, in which the treating agents are added to the treatment system in discontinuous intervals, for example, once a day, in an amount to be calculated to a concentration in the range mentioned above. In the case where the bulking and/or scumming has taken place to a slight degree, addition of only once may be enough for an effective prevention.

By adding the nonionic surfactant in the first method of the present invention or, by adding the nonionic surfactant together with the cationic surfactant in a form of a quaternary ammonium salt in the second or the third method of the present invention to the activated sludge treatment system, it is observed that the cells of the filamentous bacteria in the activated sludge become deflated within their sheath-like casing or fall off therefrom or subjected to a bacteriolysis or to a breaking of the sheath-like casing, whereby the bulking of the sludge is prevented. Here, also the actinomycetes in the activated sludge become extinct, whereby the settling of the sludge is facilitated and the formation of the causal substance for the formation of scum is excluded, so that the phenomena of bulking and scumming in the settling tank are prevented. This effect of prevention of the activated sludge from losing its settling ability is maintained over a long period of time, without having harmful influence on other bacteria than filamentous bacteria and actinomycetes while preserving the biodegradation activity of the activated sludge to organic matter.

In the second method of the present invention, a synergistic effect is attained by the combined use of the nonionic and cationic surfactants, whereby a comparable or even superior performance in preventing the activated sludge from losing its settling ability can be realized with smaller dosage amounts. Therefore, the influence of the treating agent on other bacteria becomes smaller and the biodegradation activity of the sludge to organic matter is maintained at a higher level.

In the third method of the present invention, a cationic organic flocculant is used together with the combination of a nonionic surfactant and a cationic surfactent of a form of quaternary ammonium salt, whereby the sedimentation property of the sludge is increased immediately after the addition of the treating agents, so that the prevention of bulking or scumming is reached promptly, while maintaining the durability of the preventive effect. Here, coagulation of the sludge occurs by the action of the cationic organic flocculant and the sedimentation property of the activated sludge is improved. Due to contact of the thus sedimenting sludge flocs with the surfactants, the bacteriolysis of the filamentous bacteria and actinomycetes proceeds and the effect of preventing the bulking or scumming is maintained. Here, the electric charge of the molecule of each component of the treating agent has only a little influence on the coagulation or flocculation of the sludge, since the treating agent is composed of a nonionic and a cationic surfactant and a cationic flocculant.

The components and fragments of the cells of filamentous bacteria and actinomycetes resulting after the falling-off, bacteriolysis and extinction thereof are metabolized by bacteria in the activated sludge as BOD components, so that they do not cause deterioration of the treated water.

In case the multiplication of filamentous bacteria or actinomycetes in the aeration tank is considerable, a dosage at the sludge return line will cause a gradual bacteriostatsis by bit-by-bit bacterilysis and sterilization of the filamentous bacteria and actinomycetes to convert them into BOD components in the sludge-containing liquor, which are then metabolized by bacteria in the activated sludge in the aeration tank and are not exhaused into the treated water.

If a severe foaming occurs in the aeration tank by the addition of the surfactant(s), an antifoaming agent may be employed for preventing the foaming. As the antifoaming agent, for example, silicone oils and polypropylene glycols may be enumerated. The bulking preventive effect is not affected by the addition of such an antifoaming agent.

As explained above, the first method of the present invention provides an effective prevention of the phenomena of bulking caused by filamentous bacteria and actinomycetes and scumming caused by actinomycetes in an activated sludge treatment of an aqueous organic waste, by adding a nonionic and/or an anionic surfactant to the activated sludge treatment system to thereby attain an efficient and smooth separation of the sludge without any harmful influence on humans and animals with long lasting effectiveness, so that an efficient activated sludge treatment can be maintained.

The second method of the present invention provides a more effective prevention of bulking or scumming in an activated sludge treatment of an aqueous organic waste with a smaller dose of the treating agents, by a combined use of a nonionic surfactant with a cationic surfactant of the form of a quaternary ammonium salt in the activated sludge treatment system, to thereby attain a synergistic effect of prevention of bulking or scumming with a lesser influence on other bacteria and with a higher treatment performance.

The third method of the present invention provides a prompt effect of prevention of bulking or scumming in an activated sludge treatment of an aqueous organic waste, by a combined use of a nonionic surfactant, a cationic surfactant in the form of a qautemary ammonium salt and a cationic organic flocculant in the activated sludge treatment system to thereby attain an immediate development of the preventive effect with better preservation of the preventive effect.

PREFERRED EMBODIMENT OF THE INVENTION

Below, the present invention is further described by way of Examples and Comparative Examples, wherein the per cent values given are those on the weight basis.

EXPERIMENTAL EXAMPLE 1

In a 500 ml Sakaguchi's flask, 100 ml of a pH 7 culture medium containing 0.3 g/l of glucose, 0.3 g/l of sodium acetate, 0.1 g/l of ammonium sulfate, 0.05 g/l of potassium chloride, 0.05 g/l of magnesium sulfate, 0.02 g/l of calcium carbonate, 0.02 g/l of sodium dihydrogenphosphate, 0.312 g/l of disodium hydrogenphosphate and 0.0005 g/l of ferric chloride were charged, on which one platinum loop filamentous bacterium *Sphaerotilus natans* was inoculated, whereupon the culture was conducted at 30° C. for 3 days at 100 rpm. This culture solution was centrifuged at 12,000 rpm for 15 minutes to collect the bacterial cells. The cells were suspended in a 0.05 M Tris buffer (pH 8.0) and fragmented by a homoblender to obtain a cell suspension. This suspension was diluted with a 0.05 M Tris buffer so as to reach an optical density at 660 nm ($OD_{660}$) of 1, whereto a polyoxyethylene nonylphenyl ether (HLB=14) was added so as to reach a concentration of 50 mg/l and the suspension was allowed to stand for 60 minutes at 30° C. At this occasion, the $OD_{660}$ value was lowered to 0.2. On a microscopic observation, the cells of *Sphaerotilus natans* were almost bacteriolysed and only the sheath-like casings were left behind.

EXPERIMENTAL EXAMPLE 2

In the procedures of Experimental Example 1, sodium dodecylbenzenesulfonate was added instead of the polyoxyethylene nonylphenyl ether. Similar results were obtained.

EXAMPLE 1

A sludge which showed a filamentous bacteria bulking phenomenon (MLSS 2530 mg/l, $SV_{30}$ 76, SVI 300) was placed in a 1 liter beaker, whereto a synthetic sewage water was passed continuously and the activated sludge treatment thereof was carried out at 25° C. under an aeration of 1 liter per minute with an addition of a polyoxyethylene nonylphenyl ether (HLB=14) once a day so as to calculate a dose of 50 mg/l. The synthetic sewage water had a composition of 10% of glucose, 10% of peptone, 5% of potassium dihydrogenphosphate and 10% of sodium dihydrogenphosphate and was adjusted at pH 7.0. The TOC load was settled at 0.5 kg/m³.day.

After 3 hours from the addition of the polyoxyethylene nonylphenyl ether, a bacterilysis of the filamentous bacteria was observed and, after three days, almost no filamentous bacteria was detected in the sludge.

EXAMPLE 2

In the procedures of Example 1, sodium dodecylbenzenesulfonate was added instead of the polyoxyethylene nonylphenyl ether. Similar results were obtained.

EXAMPLE 3

In a 2 liter messcylinder, 1 liter of an activated sludge (MLSS 2530 mg/l, $SV_{30}$ 76, SVI 300) which showed a filamentous bulking by *Sphaerotilus natans* was placed, whereto a surfactant as given in Table 1 below was added in an amount to reach a concentration of 50 mg/l and the sludge was aerated at 1 liter per minute. When a foam layer grew up to 800 ml, the liquid level was lowered by an addition of a small amount of a silicone antifoaming agent. After 3 hours, $SV_{30}$ was determined. Here, it was found that the $SV_{30}$ values of the bulked sludge without addition of the surfactant (control sludge) before and after the experiment showed almost no change. On a microscopic observation, no change of *Sphaerotilus natans* was observed for the control sludge, while the sludges with a surfactant showed a decrease in the $SV_{30}$ value and *Sphaerotilus natans* thereof was found to be bacteriolysed, fallen off from the sheath or shrunk within the sheath. The surfactants employed and the $SV_{30}$ values after 3 hours' aeration therewith are given in Table 1.

TABLE 1

| Surfactant | $SV_{30}$ after 3 hr |
| --- | --- |
| Sodium lauryl sulphate | 40 |
| Sodium laurylbenzenesulfonate | 45 |
| Sodium N-lauroylsarcosine | 55 |
| Sodium deoxycholate | 60 |
| Sodium cholate | 58 |
| Adduct of nonylphenol with 2 mol EO [1] (HLB = 6) | 43 |
| Adduct of nonylphenol with 5 mol EO (HLB = 10) | 24 |
| Adduct of nonylphenol with 40 mol EO (HLB = 18) | 50 |
| Adduct of octylphenol with 7 mol EO (HLB = 13) | 25 |
| Adduct of dodecylphenol with 7 mol EO (HLB = 11) | 22 |
| Adduct of alkylallyl alcohol with 6 mol EO (HLB = 13) | 27 |
| Adduct of oleyl alcohol with 7 mol EO (HLB = 10) | 35 |
| Adduct of lauryl alcohol with 3 mol EO (HLB = 8) | 36 |
| Adduct of lauryl alcohol with 7 mol EO (HLB = 14) | 22 |
| Adduct of lauryl alcohol with 14 mol EO (HLB = 15) | 25 |
| Adduct of lauryl alcohol with 23 mol EO (HLB = 17) | 48 |
| Adduct of cetyl alcohol with 9 mol EO (HLB = 13) | 28 |
| Adduct of oleic acid with 7 mol EO (HLB = 9) | 56 |
| Adduct of stearic acid with 15 mol EO (HLB = 16) | 62 |
| Polyoxyethylene sorbitan monooleate (HLB = 15) | 54 |
| Polyoxyethylene sorbitan monolaurate (HLB = 17) | 58 |
| A fattyacid ester of sucrose (HLB = 13) | 57 |
| Polyoxyethylene lanolin alcohol ether (HLB = 14) | 47 |
| Polyoxyethylene lanolate (HLB = 13) | 55 |
| Control | 76 |

[1]: EO = ethylene oxide

From the above, it is seen that the cells of filamentous bacteria are damaged by the addition of an anionic or a nonionic surfactant, whereby occurrence of bulking of the sludge in an activated sludge treatment is prevented.

EXAMPLE 4

To an activated sludge (MLSS 3290 mg/l) which did not show no bulking of filamentous bacteria under a microscope, an adduct of lauryl alcohol with 7 moles of ethylene oxide (HLB=14) was added in an amount of (A) 100 mg/l or (B) 800 mg/l. To this mixture, a solution containing peptone and glucose as a carbon source in a weight ratio of 1/1 was added in an amount enough to reach a TOC of 290 mg/l and the mixture was aerated while observing the change in TOC. The results are recited in the graph of FIG. 1.

For comparison, the same procedures were carried out with the addition of benzalkonium chloride, a quaternary ammonium salt, in an amount of (C) 100 mg/l or (D) 800 mg/l or (E) without addition of any surfactant. The results are recited in the graph of FIG. 1.

From FIG. 1, it is seen that almost no influence of the addition of the adduct of lauryl alcohol with 7 moles of ethylene oxide on the rate of decrease in the TOC (slope of the curve) was found, so that it does cause no harmful influence on other bacteria than filamentous bacteria.

On the contrary, addition of benzalkonium showed a tendency of increasing the TOC after about 20 minutes, which might have been caused by an elution from the damaged bacteria cells.

EXPERIMENTAL EXAMPLE 3

A sludge (MLSS 2,000 mg/l) which showed a filamentous bulking by a filamentous bacterium "Type 021 N" was charged in a 100 ml beaker, whereto a polyoxyethylene nonylphenyl ether (HLB=14) and cetyl trimethylammonium chloride were each added in such an amount that the concentration of the former would have reached 30 mg/l and that of the latter would have reached 1 mg/l, whereupon the mixture was allowed to stand for 20 hours at 25° C. On a microscopic observation, it was found that almost all the cells of the filamentous bacterium were subjected to bacteriolysis and only the sheath fragments were left behind.

EXAMPLE 5

A sludge (MLSS 2,000 mg/l) which showed a filamentous bulking by a filamentous bacterium Type 021 N was charged in a 1 liter beaker, whereto a polyoxyethylene nonylphenyl ether (HLB=14) and cetyl trimethylammonium chloride were each added once a day in such an amount that the concentration of the former would have reached 30 mg/l and that of the latter would have reached 1 mg/l, to which a synthetic sewage water was passed continuously and the mixture was subjected to a biosludge treatment while aerating it at a rate of 1 liter per minute at 25° C. The synthetic sewage water contained 10% of glucose, 10% of peptone, 5% of potassium dihydrogenphosphate and 10% of sodium dihydrogenphosphate and was adjusted at a pH of 7.0. The TOC load was settled at 0.5 kg/m$^3$.day.

After 12 hours, a bacteriolysis of the filamentous bacterium was observed and, after 3 days, almost no cell of the filamentous bacterium was able to be detected.

EXAMPLE 6

An experiment was carried out in an activated sludge treatment apparatus having an aeration tank of 800 m$^3$ and a settling tank of 300 m$^3$ in a food production factory, in which a waste water of a BOD of 600 mg/l was treated at a volumetric load of 0.63 kg-BOD/m$^3$.day in the aeration tank. The filamentous microorganism included was Type 1701 and the MLSS was 4,800 mg/l and the SVI was 480. From above the aeration tank, a polyoxyethylene lauryl ether (HLB=14) and lauryl trimethylammonium chloride were each added at a dose of 150 mg/l and 10 mg/l, respectively. The SVI value started to decrease immediately after the addition of the treating agents and, after 6 days, the MLSS became 5,100 mg/l and the SVI reached 190. Thereafter, almost no change in the SVI was recognized for about 1 month.

EXAMPLE 7

An aerobic sludge treating apparatus having a 5 liter aeration tank and a 2 liter settling tank was charged with a sludge (MLSS 2,000 mg/l) which showed a filamentous bulking by a filamentous bacterium Type 021 N, whereto the synthetic sewage water of Example 1 was passed to subject it to a biological treatment while aerating it at 5 liters per minute at 25° C. The TOC load was settled at 0.5 kg/m$^3$.day. The supply rate of the sewage water was settled at 15 liter/day and the sludge return rate was settled at 80%. In the sludge return line, a polyoxyethylene nonylphenyl ether (HLB=14) and cetyl trimethylammonium chloride were each supplied continuously at a dose of 50 mg/l and 2 mg/l, respectively. A bacterilysis of filamentous microorganisms was observed and, after three days, almost no cell of the filamentous bacterium was able to be detected in the sludge. The SVI value decreased from 600 ml/g to 150 ml/g. The TOC in the treated water was found to be 15 mg/l and this value did not vary.

EXPERIMENTAL EXAMPLE 4

A 100 ml beaker was charged with a sludge (MLSS 2,000 mg/l) in which Nocardia was multiplicated and a bulking occured, whereto a polyoxyethylene nonylphenyl ether (HLB=14) and cetyl trimethylammonium chloride were each added in an amount to reach a concentration of 30 mg/l and 3 mg/l, respectively, whereupon the mixture was allowed to stand at 25° C. for 20 hours. On a microscopic observation, it was found that almost all the cells of the filamentous microorganism were bacteriolysed.

EXAMPLE 8

A 1 liter beaker was charged with a sludge (MLSS 2,000 mg/l) in which Nocardia was multiplicated and a bulking occured and to which a polyoxyethylene nonylphenyl ether (HLB=14) and cetyl trimethylammonium chloride were each added once a day in an amount to reach a concentration of 30 mg/l and 3 mg/l, respectively, whereto the synthetic sewage water of Example 1 was passed to subject it to a biological treatment while aerating it at 1 liter per minute at 25° C. The TOC load was settled at 0.5 kg/m$^2$.day.

The SVI value was decreased from 300 ml/g to 100 ml/g and the settling ability was improved. After 2 hours, a bacteriolysis of Nocardia was observed and, after 1 day, almost no cell of Nocardia was able to be detected in the sludge.

EXPERIMENTAL EXAMPLE 5

A sludge (MLSS 2,000 mg/l) which showed a filamentous bulking by a filamentous bacterium Type 021 N was charged in a 100 ml beaker, whereto a polyoxyethylene nonylphenyl ether (HLB=14), cetyl trimethylammonium chloride and a polyethyleneimine were added each in an amount to reach a concentration of 30 mg/l, 3 mg/l and 10 mg/l, respectively, whereupon the mixture was stood still for 20 hours at 25° C. On a microscopic observation, it was found that almost all the cells of the filamentous bacterium were subjected to bacteriolysis and only the sheath fragments were left behind.

EXAMPLE 9

A sludge (MLSS 2,000 mg/l) which showed a filamentous bulking by a filamentous bacterium Type 021 N was charged in a 1 liter beaker, whereto a polyoxyethylene nonylphenyl ether (HLB=14), cetyl trimethylammonium chloride and a polyethyleneimine were each added once a day in an amount to reach a concentration of 30 mg/l, 3 mg/l and 10 mg/l, respectively, whereto the synthetic sewage water of Example 1 was passed to subject it to a biological treatment while aerating it at 1 liter per minute at 25° C. The TOC load was settled at 0.5 kg/m$^3$.day.

The SVI value was decreased from 600 ml/g to 100 ml/g and the settling ability was improved immediately. After 12 hours, a bacteriolysis of the filamentous bacterium was observed and, after 3 days, almost no cell of the filamentous bacterium was able to be detected in the sludge.

EXAMPLE 10

An experiment was carried out in an activated sludge treatment apparatus having an aeration tank of 720 m$^3$ and a settling tank having 150 m$^3$ in a textile dyeing factory, in which a waste water of a BOD of 600 mg/l was treated at a volumetric load of 0.3 kg-BOD/m$^3$.day in the aeration tank. The filamentous microorganism included was Thiothrix and the MLSS was 3,500 mg/l and the SVI was 530. From above the aeration tank were added a polyoxyethylene lauryl ether (HLB=14), lauryl trimethylammonium chloride and a polyethyleneimine at a dose of 150 mg/l, 10 mg/l and 30 mg/l, respectively. The SVI value began to decrease immediately after the addition of the treating agents and, after 2 days, the MLSS became 3,200 mg/l and the SVI reached 190. Thereafter, almost no change in the SVI was recognized for about 1 month.

EXAMPLE 11

To an activated sludge (MLSS 3290 mg/l) which did not show no bulking of filamentous bacteria under a microscope, an adduct of lauryl alcohol with 7 moles of ethylene oxide (HLB=14) and lauryl trimethylammonium chloride were added in an amount of 800 mg/l and 80 mg/l, respectively. To this mixture (F), a solution containing peptone and glucose in a weight ratio of 1:1 as carbon sources was added in an amount enough to reach a TOC of 290 mg/l and the mixture was aerated while observing the change in TOC. The results are recited in the graph of FIG. 2.

For comparison, the same procedures were carried out with the addition of (G) 800 mg/l of the adduct of lauryl alcohol with 7 moles of ethylene oxide (HLB=14) or (H) without addition of any surfactant. The results are recited in the graph of FIG. 2.

From FIG. 2, it is seen that almost no influence of the addition of 80 mg/l of the lauryl trimethylammonium chloride on the rate of decrease in the TOC (slope of the curve) was found, so that it does not have a harmful influence on other bacteria other than filamentous bactria.

We claim:

1. A method for preventing activated sludge containing at least one of filamentous bacteria and actinomycetes in a settling tank from losing its settling ability due to bulking or scumming in an activated sludge treatment of an aqueous organic waste in a treatment system including an aeration tank, said settling tank and a sludge return line between said aeration tank and said setting tank, comprising adding a surfactant selected from the group consisting of a nonionic surfactant and an anionic surfactant to the activated sludge in at least one of said aeration tank and said sludge return line and subjecting the filamentous bacteria and actinomycetes to bacteriolysis.

2. A method as claimed in claim 1, wherein the amount of addition of the nonionic surfactant and/or the anionic surfactant is in the range of 5–1,000 milligrams per liter of the sludge-containing liquor being treated.

3. A method for preventing activated sludge containing at least one of filamentous bacteria and actinomycetes in a settling tank from losing its settling ability due to bulking or scumming in an activated sludge treatment of an aqueous organic waste in a treatment system including an aeration tank, said settling tank and a sludge return line between said aeration tank and said settling tank, comprising adding a nonionic surfactant and a cationic surfactant of a form of quaternary ammonium salt to the activated sludge in at least one of said aeration tank and said sludge return line and subjecting the filamentous bacteria and actinomycetes to bacteriolysis.

4. A method as claimed in claim 3, wherein the amount of addition of the nonionic surfactant is in the range of 5–1,000 milligrams and that of the cationic surfactant is in the range of 0.5–100 milligrams, per liter of the sludge-containing liquor being treated, respectively.

5. A method for preventing activated sludge containing at least one of filamentous bacteria and actinomycetes in a settling tank from losing its settling ability due to bulking or scumming in an activated sludge treatment of an aqueous organic waste in a treatment system including an aeration tank, said settling tank and a sludge return line between said aeration tank and said settling tank, comprising adding a nonionic surfactant, a cationic surfactant of a form of quaternary ammonium salt and a cationic organic flocculant to the activated sludge in at least one of said aeration tank and said sludge return line system and subjecting the filamentous bacteria and actinomycetes to bacteriolysis.

6. A method as claimed in claim 5, wherein the amount of addition of the nonionic surfactant is in the range of 5–1,000 milligrams, that of the cationic surfactant is in the range of 0.5–100 milligrams and that of the cationic organic flocculant in the range of 10–100 milligrams, per liter of the sludge-containing liquor being treated, respectively.

7. In a method of preventing bulking or scumming of activated sludge in an aqueous organic waste containing at least one of filamentous bacteria and actinomycetes in a settling tank wherein said aqueous organic waste is biodegraded with a treatment system including an aeration tank, said settling tank and a sludge return line between said aeration tank and said settling tank, the improvement comprising adding an additive consisting essentially of at least one member selected from the group consisting of a nonionic surfactant and an anionic surfactant to the activated sludge in at least one of said aeration tank and said sludge return line and subjecting the filamentous bacteria and actinomycetes to bacteriolysis.

8. A method as claimed in claim 7, wherein the amount of addition of said at least one member is in the range of 5–1000 milligrams per liter of the sludge-containing liquor being treated.

9. A method as claimed in claim 7, wherein said additive consists of said at least one member.

* * * * *

UNITED STATES PATENT AND TRADEMARK OFFICE
CERTIFICATE OF CORRECTION

PATENT NO. : 5,536,410
DATED : July 16, 1996
INVENTOR(S) : Katsura Kitatsuji et al It is certified that error appears in the above-indentified patent and that said Letters Patent is hereby corrected as shown below:

Col. 13, line 39; change "setting" to ---settling---.
Col. 14, line 24; delete "system".

Signed and Sealed this

Twenty-sixth Day of November 1996

Attest:

BRUCE LEHMAN

*Attesting Officer*     *Commissioner of Patents and Trademarks*